United States Patent

Malarkey et al.

[11] 4,068,194
[45] Jan. 10, 1978

[54] LASER SYSTEM

[75] Inventors: Edward C. Malarkey, Severna Park; Robert P. Pautienus, Laurel, both of Md.

[73] Assignee: Westinghouse Electric Corporation, Pittsburgh, Pa.

[21] Appl. No.: 680,253

[22] Filed: Apr. 26, 1976

[51] Int. Cl.² .............................................. H01S 3/22
[52] U.S. Cl. .............................................. 331/94.5 G
[58] Field of Search ..................... 331/94.5 G; 330/4.3

[56] References Cited

U.S. PATENT DOCUMENTS 3,596,202  7/1971  Patel ............................. 331/94.5 G

OTHER PUBLICATIONS

Woskoboinikow et al., *Applied Physics Letters*, vol. 27, No. 12, Dec. 15, 1975, pp. 658–660.
Downey et al., *Journal of Chemical Physics*, vol. 64, No. 7, Apr. 1, 1976, pp. 2858–2862.
Downey et al., Journal of Chemical Physics, vol. 64, No. 7, Apr., 1976, pp. 2854–2857.

Primary Examiner—William L. Sikes
Assistant Examiner—Marcus S. Rasco
Attorney, Agent, or Firm—M. P. Lynch

[57] ABSTRACT

A gas laser system utilizing a mixture of water vapor, hydrogen or hydrogen deuteride and nitrogen wherein molecular vibrations are excited in the hydrogen or hydrogen deuteride in an electric discharge and the vibrational energy is stored until, by means of near-resonant energy exchange collisions, it is transferred to the active laser water molecules. Nitrogen is added to stabilize the discharge and allow coherent emission at 4.6 microns with a theoretical efficiency of about 58%.

4 Claims, 2 Drawing Figures

LASER SYSTEM

BACKGROUND OF THE INVENTION

As is known, gas lasers have been developed in the past wherein one gas in its metastable vibrational level can be used to selectively populate an upper level of another gas through resonant transfer via inelastic collisions. One such system is described in Patel U.S. Pat. No. 3,411,105 wherein the vibrational energy of nitrogen is transferred to carbon dioxide, the active laser medium. In the carbon dioxide-nitrogen laser, an electric discharge in a mixture of these gases results in collisions of electrons in the discharge with nitrogen molecules, thereby exciting them vibrationally. The cross section for these excitation processes is quite high. Since the nitrogen molecule, like all homonuclear diatomic molecules, possesses no intrinsic electric dipole moment in any of its vibrational states, relaxation of vibrationally excited nitrogen via emission of radiation is impossible. An excited molecule, therefore, retains its excess energy until it gives it up by collision which can be either with a container wall or with some other molecular species.

It happens that the first excited vibrational state of nitrogen, which lies at 2331 $cm^{-1}$ above the ground vibrational state, coincides almost exactly in energy with the first excited state of the asymmetric stretching vibration of carbon dioxide at 2349 $cm^{-1}$. Because of this near coincidence, excited nitrogen molecules can, upon collision with unexcited carbon dioxide molecules, efficiently transfer their energy to the carbon dioxide molecules, leaving the latter in the first excited state of its asymmetric stretch vibration, the upper state of its laser transitions. Since this excitation occurs preferentially, this first excited state of carbon dioxide becomes populated while the lower lying states remain unpopulated. As a result, a population inversion, much like that in a four-level laser, is immediately created with energy being released in the form of coherent radiation.

Although laser action will occur in carbon dioxide-nitrogen mixtures without the addition of other gases, the addition of helium or some other noble gas to the mixture increases the efficiency markedly. The helium or other noble gas acts to slow down the rate of energy loss from excited nitrogen atoms by wall collisions, moderates the energy of the discharge electrons, increases the nitrogen excitation efficiency, and spreads the discharge more uniformly throughout the active medium. Efficiencies of 30% have been observed in electric discharge pumped carbon dioxide-nitrogen-helium lasers, the maximum theoretical efficiency being given by the ratios of the energies of the laser state and of the laser quantum and is 41% for the 10.6 micron transition.

In copending application Ser. No. 680,252, filed Apr. 26, 1976, there is described a gas layer system which operates under the same basic principles as the carbon dioxide-nitrogen laser but which employs water vapor as the main lasing medium and hydrogen deuteride as the exciting molecule for the water vapor molecules in much the same manner as nitrogen molecules are used to excite carbon dioxide molecules as described above. While not mentioned in the foregoing copending application, hydrogen deuteride can be replaced by hydrogen with a small decrease in efficiency. It has been found, however, that in contrast to the carbon dioxide-nitrogen laser, the addition of a noble gas such as helium to the mixture actually decreases the efficiency of the system rather than increasing it. At the same time, it has been found that a relatively unstable discharge is achieved when hydrogen or hydrogen deuteride is used solely with water vapor.

SUMMARY OF THE INVENTION

In accordance with the present invention, there is provided a new and improved gas laser system which employs a mixture of water vapor with hydrogen deuteride or hydrogen and which additionally includes nitrogen, the laser system emitting coherent radiation in the range of about 3–5 microns and specifically 4.6 microns. The addition of nitrogen, without a noble gas, markedly increases the efficiency of the system. Additionally, additions of oxygen to the mixture will further enhance the rise time of the 4.6 micron output.

In a specific embodiment of the invention, there is provided a laser for producing coherent radiation comprising (1) a pair of spaced-apart reflectors forming a resonant cavity for reflecting coherent radiation, (2) an envelope disposed between the mirrors and having transparent end windows adjacent the mirrors, (3) a gaseous mixture of water vapor, hydrogen deuteride or hydrogen, and nitrogen within the envelope, and (4) means for exciting the gas mixture by electrical energy to raise the hydrogen deuteride or hydrogen to its first metastable state, thereby to induce laser emission by vibrationally exciting the water vapor molecules. The partial pressure of water vapor is preferably about 0.05 to 0.10 Torr, that of hydrogen or hydrogen deuteride about 0.05 Torr and that of nitrogen about 1 to 5 Torr.

The above and other objects and features of the invention will become apparent from the following detailed description taken in connection with the accompanying drawings which form a part of this specification, and in which.

Figure 1:
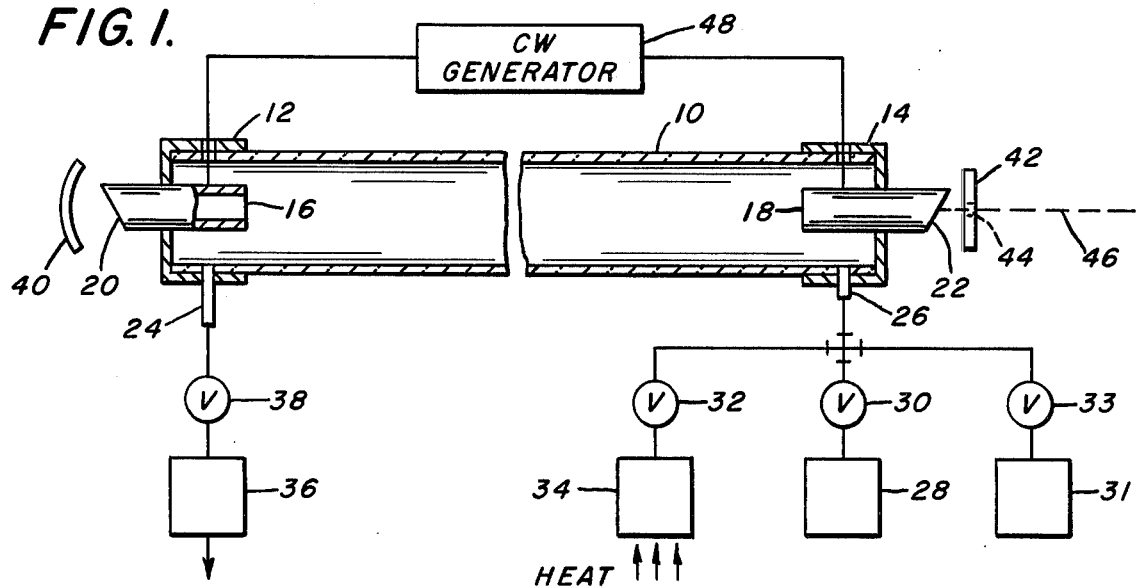
FIG. 1 is a schematic diagram of the laser system of the invention.

With reference now to the drawings, and particularly to FIG. 1, the apparatus shown includes a quartz tube 10 typically having an overall length of about 160 centimeters and an inner diameter of 3 centimeters. The tube has square-cut ends and is fitted with metal end caps 12 and 14. Extending through the end caps 12 and 14 are cylindrical or tubular electrode members 16 and 18 fitted at their outer ends with Brewster angle sodium chloride windows 20 and 22, respectively; although other window materials can also be used. The end caps 12 and 14 also contain the ports 24 and 26 for gas flow. Hydrogen or hydrogen deuteride is supplied from a source 28 to the port 26 through valve 30. The water vapor is supplied through valve 32 to the same port 26. The source of water vapor 34 preferably comprises a distillation flast filled with deionized, double-distilled water. Heat, schematically illustrated by the arrows in FIG. 1, is applied to the flask 34 to generate the water vapor which flows into the tube 10. Nitrogen from source 31 can be supplied to the interior of the enclosure through valve 33. The vacuum pump 36 is connected to port 24 at the other end of the tube 10 through valve 38.

Adjacent the Brewster angle window 20 is a curved mirror 40; and adjacent the other Brewster angle window 22 is a flat mirror 42 provided with an opening 44 through which a laser beam 46 may pass. The electrodes 16 and 18 are connected to a continuous wave generator 48 as shown; however direct current or pulsed excitation may be utilized if desired.

In order to effect laser action, the valves 30, 32 and 33 are opened, valve 38 is also opened and pump 36 is actuated to thereby fill the tube with a mixture of water vapor, hydrogen or hydrogen deuteride and nitrogen. The partial pressure of water vapor is preferably about 0.05 to 0.10 Torr, that of hydrogen or hydrogen deuteride about 0.05 Torr and that of nitrogen about 1 to 5 Torr. After the tube 10 is evacuated of air and filled with the mixture of gases, all valves 30, 32, 33 and 38 are closed and generator 48 is actuated to establish a potential between the electrodes 16 and 18. Under 60-hertz alternating current discharge conditions provided by generator 48, coherent radiation at 4.6 microns is emitted. Typical discharge voltages at the pressures given above are 3000 to 7000 volts for a 150-centimeter gap between electrodes. Typical discharge currents range from 10 to 70 milliamperes.

Figure 2:
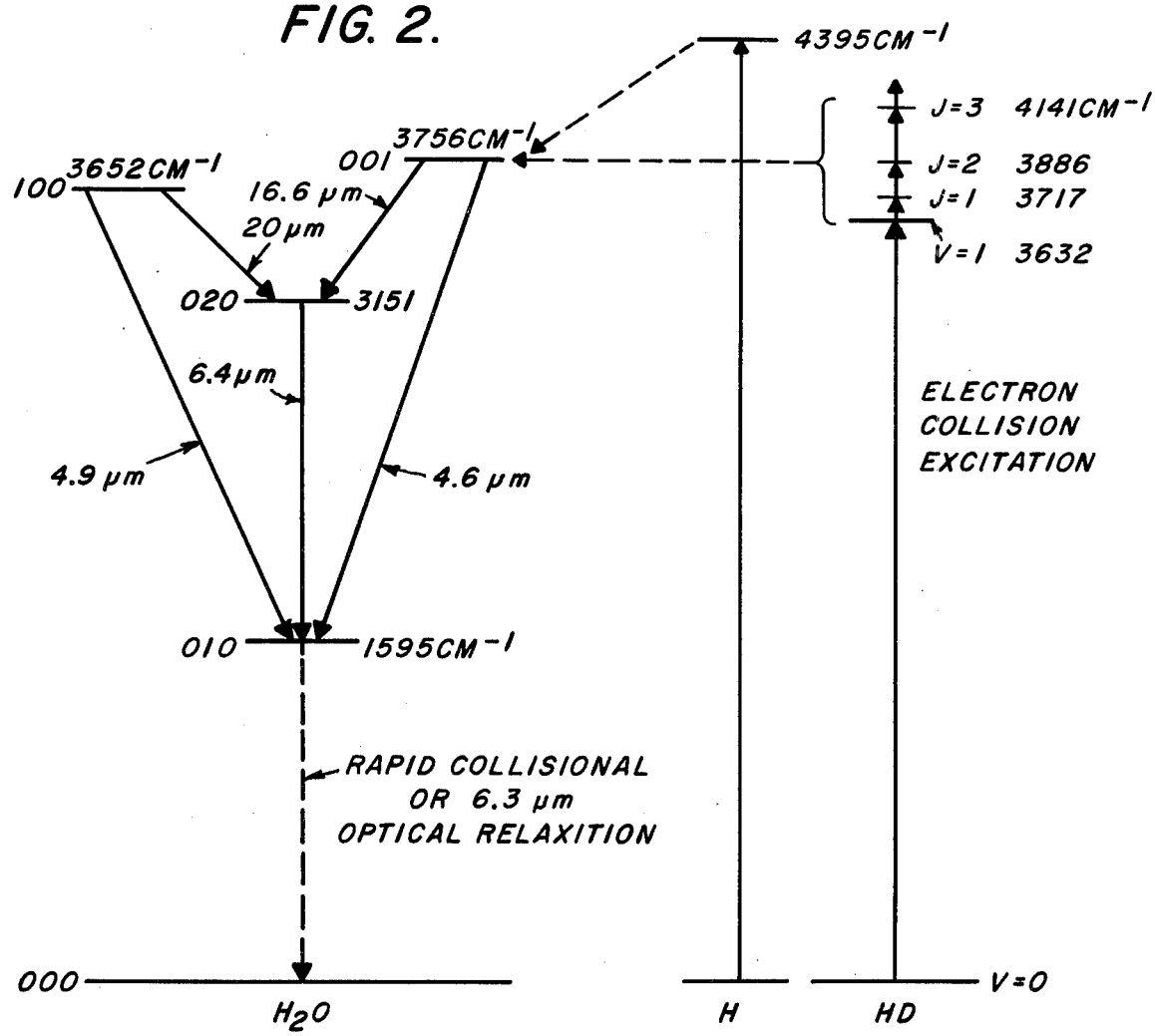
FIG. 2 is a vibrational energy level diagram of a water vapor-hydrogen deuteride-hydrogen system.

The operation of the laser system of the invention can be understood from the vibrational energy level diagram for water vapor and hydrogen deuteride shown in FIG. 2 where only the lower lying vibrational states are indicated. Water vapor is a non-linear asymmetrical molecule with three degrees of vibrational freedom. The fundamental vibrational modes are similar to those of carbon dioxide and the same nomenclature can be used to describe them. The energy values for the states under consideration are 100 at 3652 cm$^{-1}$, 010 at 1595 cm$^{-1}$, 020 at 3151 cm$^{-1}$ and 100 at 3756 cm$^{-1}$.

Unlike the case of carbon dioxide, all of the transitions in the water molecule are allowed by the selection rules. The relative transition probabilities can be inferred to some extent by the magnitude of the change in dipole moment associated with each transition. Thus, the transition from state 000 to state 001 involves a considerably greater dipole moment change than does the 000 to 100 transition and can be expected to have a higher probability of occurring. In an electric discharge in pure water vapor, collisions with electrons can be expected to excite all of the molecular vibrations, but the excitation rates should roughly follow the optical transition probabilities. On this basis, it can be expected that excitation of the 010 and 001 states should occur most readily and at roughly equal rates, with the 001 state slightly favored. It is unlikely, therefore, that any appreciable population inversion can be achieved between the 001 and 010 states in a pure water vapor discharge. The laser action occurs between the 001 and 020 states in a water vapor discharge and not between the 001 and 010 states supports this contention.

The 010 state of water vapor is known, however, to be extremely short-lived, meaning that it is possible to achieve a population inversion by means of an energy transfer interaction which would preferentially populate the 001 or 100 state. Hydrogen deuteride forms homonuclear diatomic molecules which are subject to the same radiation restrictions as the nitrogen molecule. As a result, once they are vibrationally excited, they must relax via collisional deactivation. The first vibrational state of hydrogen deuteride lies at 3632 cm$^{-1}$, or very close to that of the 100 and 001 states of water vapor which are at 3652 cm$^{-1}$ and 3756 cm$^{-1}$, respectively.

FIG. 2 shows the first four rotational levels (J = 0, 1, 2, 3) of the $v = 1$ state of hydrogen deuteride. It can be seen that the J = 0 state lies very close to the energy of the 100 state of water vapor; while the J = 1 and J = 2 states lies closer to the 001 state of water vapor. The reason for inclusion of these rotational states lies in the fact that a Boltzmann distribution of rotational state populations is set up in equilibrium with the translational temperature of a gas within times of the order of 10$^{-7}$ seconds or less after excitation of the molecule to the $v = 1$ state, and that this distribution is maintained throughout the lifetime of the vibrational state. The importance of this is illustrated in the following Table I which gives the rotational state population distributions for a system temperature of 400° K, a rotational-translational temperature which might be expected in a low-pressure discharge. The following Table I shows that some 60.9% of the excited hydrogen deuteride molecules will be found in either the J = 1 or J = 2 state which are more nearly in resonance with the 001 state than with the 100 state of water vapor.

TABLE I

ROTATIONAL POPULATIONS AND E VALUES FOR HD—H$_2$O AT 400° K

| J | E (v,J) | $\Delta^E$100 | $\Delta^E$001 | Population |
|---|---|---|---|---|
| 0 | 3632 cm$^{-1}$ | −20 cm$^{-1}$ | −124 cm$^{-1}$ | 14.48% |
| 1 | 3717 | +65 | −39 | 31.97 |
| 2 | 3886 | +234 | +130 | 28.90 |
| 3 | 4141 | +489 | +375 | 16.26 |
| 4 | 4477 | 825 | 721 | 8.4 |

From the foregoing, it is apparent that energy transfer from hydrogen deuteride to water vapor will favor population of the 001 state.

Transitions from the 001 state of water vapor (FIG. 2) to any of the three lower lying states are allowed, so that laser action is possible for all three. The 001 to 010 transition, however, is the most probable of the three to give the desired 4.6 micron emission and, in fact, this proves to be the case in actual practice.

Instead of using hydrogen deuteride as the exciting medium, it is also possible to use hydrogen. As can be seen from FIG. 2, the $v = 1$ state of hydrogen lies at 4395 cm$^{-1}$, slightly above the 100 and 001 states of water vapor. Hence, hydrogen can be substituted for hydrogen deuteride with, however, a loss in efficiency.

In accordance with the present invention, it has been found that the energy transferred to water vapor can be improved materially by additions of nitrogen to the gas mixture. Investigations show that, for electron energies near the vibrational energy levels, hydrogen and hydrogen deuteride have excitation cross sections seventeen and eight times larger, respectively, than that of nitrogen near its vibrational energy threshold. The absolute values are, however, still quite small, in agreement with the forbidden nature of direct impact excitation. The data for hydrogen at higher energies shows a peak cross section near 2 electron volts which is approximately 20% as large as that of nitrogen, but the excitation spectrum is considerably broader. That is, the hydrogen excitation spectrum extends beyond 8 electron volts while that of nitrogen falls to zero at about 3.5 electron volts. When comparing the electron impact vibrational excitation cross sections for nitrogen and hydrogen, it will be found that a comparison of the areas under the two curves shows that the integrated cross section for hydrogen is 50–60% of that of nitrogen. When it is noted that the nitrogen cross section represents a sum over excitations to any of the first eight vibrational levels while that given for hydrogen represents excitation to only the $v = 1$ state, it will be appreciated that the vibrational excitation of hydrogen by low energy electrons will proceed at a rate comparable to that of nitrogen.

In actual experimental studies, it was found that the nearly optimum partial pressures of nitrogen and water vapor were found to be approximately 800 to 1200 micrometers of mercury and 50 to 100 micrometers of mercury, respectively, in the absence of hydrogen. The effect of the addition of 50 micrometers of mercury of hydrogen was then examined, and results as those listed in the following Table II were obtained:

TABLE II

RESULTS OF STATIC DISCHARGE RUNS IN $N_2$—$H_2O$—$H_2$ MIXTURES

| RUN NO. | | Ip (1st SCAN) | Ip (2nd SCAN) | Ip (3rd SCAN) | DISCHARGE TIME (BEFORE 3rd SCAN) |
|---|---|---|---|---|---|
| 1 | $N_2$—$H_2O$ | 5 | 30 | — | |
| 2 | $N_2$—$H_2O$ | 5 | 20 | 100 | 35 min. |
| 3 | $N_2$—$H_2O$ Add $H_2$ after 1st Scan | 5 | 80 | 100 | 5 min. |
| 4 | $N_2$—$H_2O$—$H_2$ | 65 | 100 | — | |
| 5 | $N_2$—$H_2O$ | 5 | 20 | 50 | 5 min. |

Ip represents intensity of discharge.

In the series of runs described in Table II, all spectral scans were taken at the same instrument sensitivity and at the same scan speed of 0.4 microns per minute. In all cases, the second scan from 4.0 to 5.0 microns was taken with as little delay as possible after the first scan so that the total elapsed discharge time by the end of the second scan was in all cases about 5 minutes. The spectrum in all cases was a complex band or series of bands, extending from about 4.4 microns to about 4.9 microns, but the main peak in all cases lay near 4.65 microns. The tube was exhaused for 15 minutes between gas fills.

The foregoing Table II shows quite clearly that the addition of hydrogen to nitrogen-water vapor mixtures strongly enhances the output intensity, thus showing that energy transfer does take place from hydrogen to water vapor. The same result will occur with hydrogen deuteride replacing hydrogen. Furthermore, it has been found that the addition of oxygen to the mixture enhances the output growth rate. That is, the addition of oxygen strengthens the 4.6 micron output intensity and also results in a second complex band structure peaking near 4.9 microns.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. A laser for producing coherent radiation comprising a pair of spaced-apart reflectors forming a resonant cavity for reflecting coherent radiation, an envelope disposed between the mirrors and having transparent end windows adjacent the mirrors, a gaseous mixture within the envelope, said gaseous mixture comprising water vapor, nitrogen and a gas selected from the group consisting of hydrogen and hydrogen deuteride, and means for exciting the gas mixture by electrical energy to raise the gas selected from hydrogen and hydrogen deuteride to its first metastable state, whereby laser emission in a range of about 3 to 5 microns is induced by vibrationally exciting the water vapor molecules.

2. The laser of claim 1 wherein the partial pressure of water vapor in said mixture is about 0.05 to 0.10 Torr, the partial pressure of nitrogen is about 1 to 5 Torr, and the partial pressure of a gas selected from the group consisting of hydrogen and hydrogen deuteride is about 0.05 Torr.

3. The laser of claim 1 wherein said gas mixture additionally includes oxygen.

4. The laser of claim 1 is wherein the laser emission occurs at about 4.6 microns.

* * * * *